UNITED STATES PATENT OFFICE.

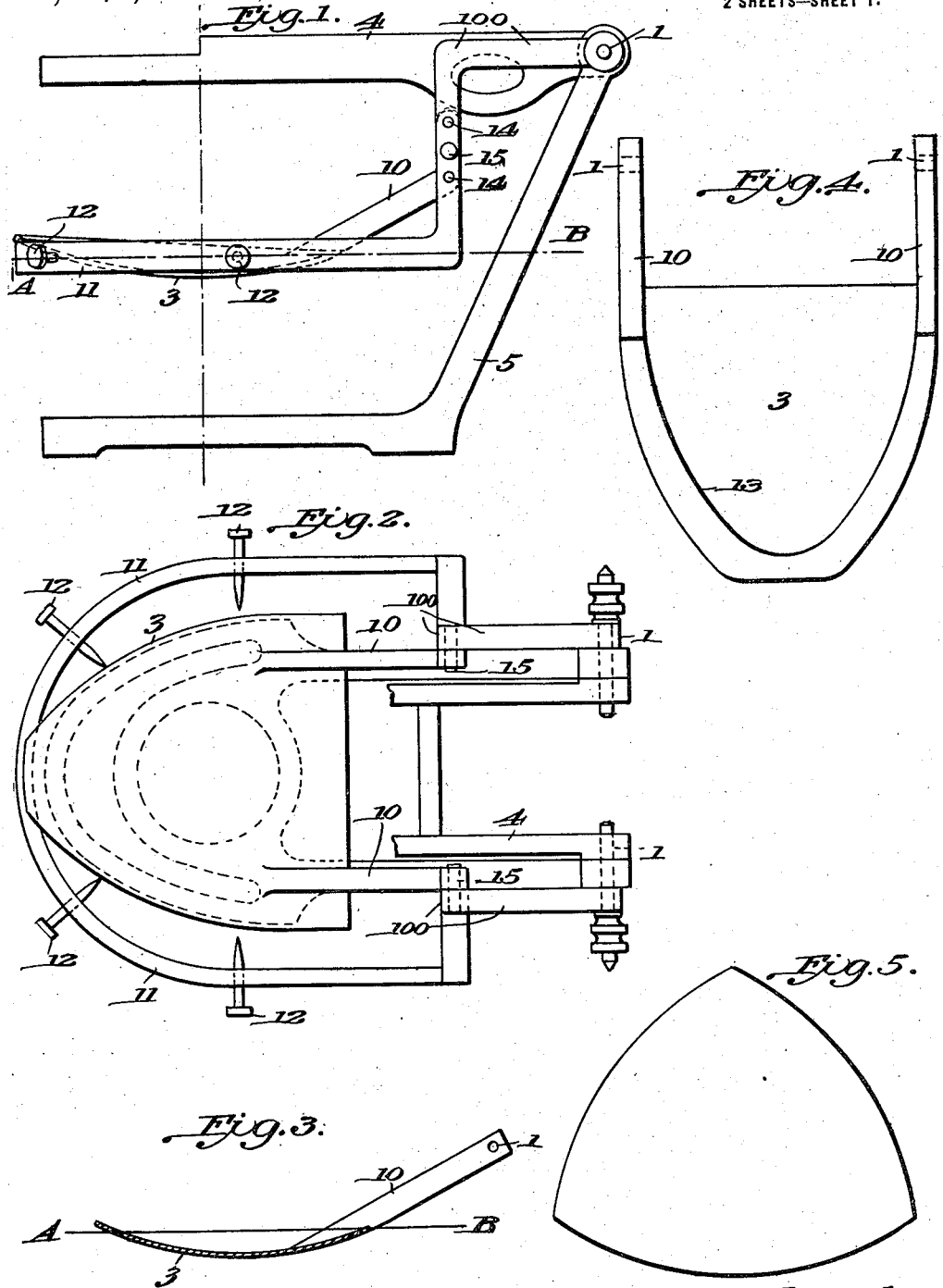

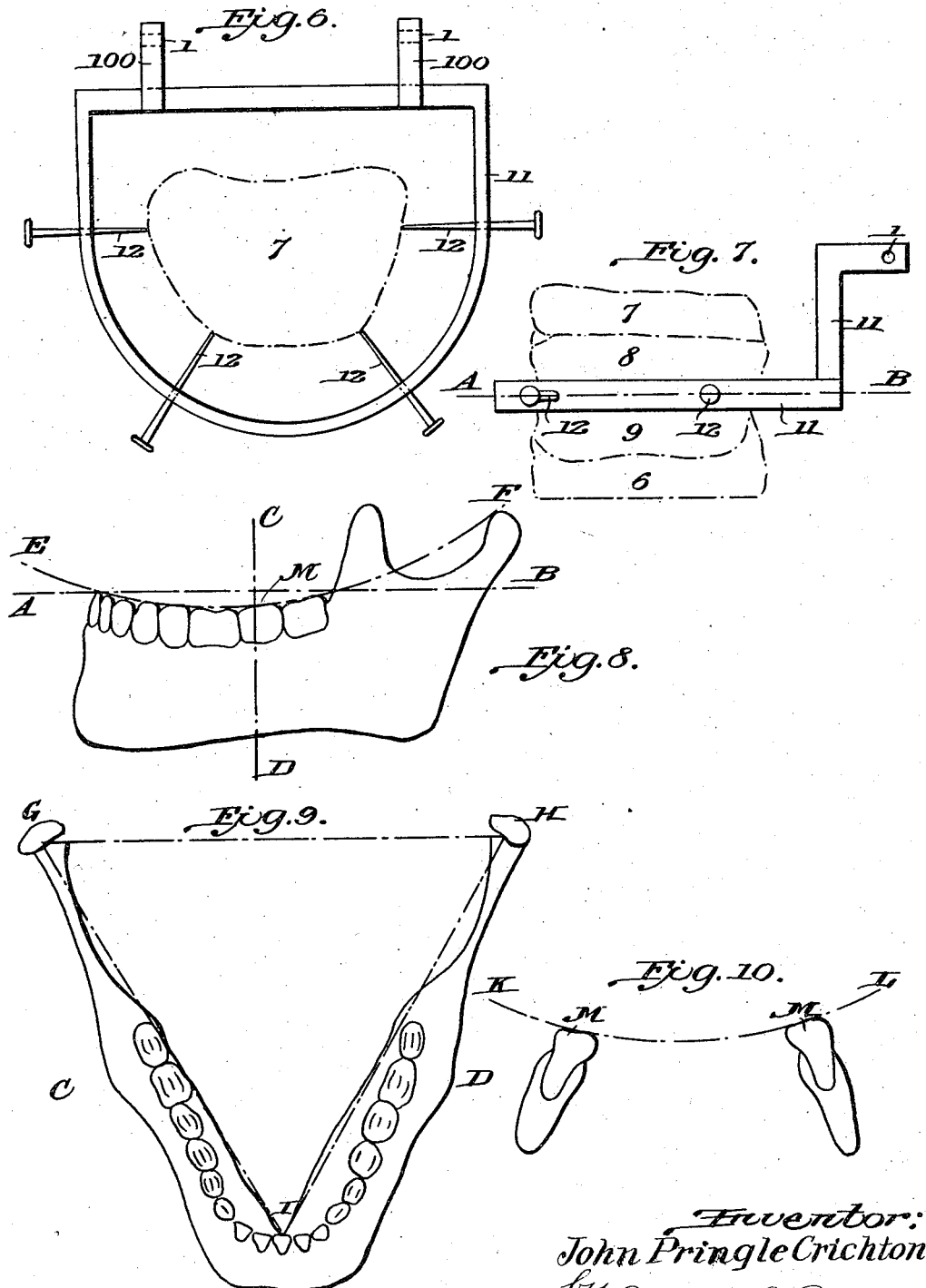

JOHN PRINGLE CRICHTON, OF PERTH, SCOTLAND, ASSIGNOR TO THE DENTAL MANUFACTURING COMPANY LIMITED, OF LONDON, ENGLAND.

DENTAL ARTICULATOR.

1,201,563.  Specification of Letters Patent.  Patented Oct. 17, 1916.

Application filed March 16, 1915. Serial No. 14,631.

*To all whom it may concern:*

Be it known that I, JOHN PRINGLE CRICHTON, a subject of the King of Great Britain, residing at 7 Charlotte street, Perth, in the county of Perth, Scotland, have invented a new and useful Improvement in Dental Articulators, of which the following is a specification.

The present invention is designed to provide means adapted to be applied to any of the articulators known to dental practitioners whether of the simpler or more complex forms to make the adjustment of artificial teeth to the various relations of the human jaws and teeth in the average, more accurate, by eliminating the previous uncertainty of result save in the most skilled hands, and substituting therefor an automatic accuracy with ordinary care and attention.

As is known from the observations of Count Spee, the occlusal surfaces of the teeth in the lower jaw of the human subject and the articular surface of the joint of the lower jaw, form a curve, varying in size with the individual, which forms a segment of a circle beginning at the incisive edges of the lower incisors, passing over the crest of the buccal cusps of the lower biscuspids and molars and ending in the anterior border of the condyloid process.

It was also observed by Dr. Bonwill that on the average the lower jaw in the human subject conforms to certain definite measurements. These measurements comprise what is known as Bonwill's triangle. This triangle is formed of imaginary straight lines joining the articular surfaces of the lower jaw to each other and to the point of contact of the two lower front teeth at the occlusal edge.

The measurements reached by these observers show that Spee's curve is a segment of a circle, with a radius of four inches approximately, while Bonwill's triangle is a triangle measuring in each of its sides four inches approximately.

The present invention comprises an instrument whereby the average measurements of the human jaw as observed by Count Spee and Dr. Bonwill can be obtained automatically.

In order that my invention may be more readily comprehended and understood and for the purpose of facilitating the description thereof, I have illustrated one form of a convenient embodiment thereof in the accompanying drawings, but it will be understood that changes and modifications in the details of construction may be made within the scope of the claims without departing from my invention.

In the drawings: Figure 1 shows a side view of the combined instrument mounted on the joint of an articulator for obtaining automatically the average measurements of the human jaw as observed by Count Spee and Dr. Bonwill; Fig. 2 shows a plan of Fig. 1, but removed from the articulator; Fig. 3 shows a side view of the guiding member for obtaining the occlusal surfaces of the teeth; Fig. 4 shows a plan view of Fig. 3; Fig. 5 shows a plan view of the under surface of the guide member when shaped to the most perfect form; Fig. 6 shows a plan view of the frame or carrier with the dummy models of the upper and lower jaws in position; Fig. 7 shows a side view of Fig. 6; Fig. 8 shows a diagrammatical view showing the curve of Count Spee in the human jaw; Fig. 9 shows a diagrammatical view of Dr. Bonwill's triangle in the human jaw, and Fig. 10 shows a transverse section on the line C—D of Figs. 8 and 9.

For the sake of clearness, I will first refer to Figs. 8, 9 and 10. The line A—B of Fig. 8 represents the occlusal plane of the human jaw. The curve E M F (Fig. 8) shows Spee's curve. The curve K L (Fig. 10) shows a curve hitherto unnamed, but which may be conveniently called the transverse curve. As clearly illustrated at M in Figs. 8 and 10, the occlusal surfaces of the teeth conform alike to Spee's curve and to the transverse curve above referred to. The lines G—H—I in Fig. 9 represent Dr. Bonwill's triangle. These measurements form the basis of the instrument of my invention.

The subsidiary member of the instrument is the frame or carrier illustrated in Figs. 7 and 9 which is pivoted as shown in Fig. 2 by the arms 100 to the parts of the articulator which represent the condyles of the human jaw. The arch of the carrier illustrated in the plan view shown in Fig. 6, is constructed to lie in the occlusal plane when hinged to the articulator, according to the measurements of Bonwill and Spee. Its function is to facilitate the fixing in position in the occlusal plane of the articulator of the trial plates and models of the jaws on which the artificial teeth are to be fitted so as to be anatomically accurate. One or both trial plates on which the artificial teeth are to be fitted is supported in the said frame so as to lie in the occlusal plane, by means of the pins 12 which are passed through holes in the curved part of the member 11 of the carrier as shown in Fig. 6. When the said plates have been suspended by the frame or carrier in the desired position, the models of the jaws in which said dummy models of artificial teeth or trial plates are set, are fixed to the arms 4 and 5 of the articulator in the usual manner but in the correct anatomical position. It will be understood that while the frame or carrier is being employed to find the occlusal plane for the trial plates 8 and 9 (see Fig. 7) the guiding surface 3 is turned back upon its pivots 15 (Figs. 1 and 2) to a position in which it does not lie in the occlusal plane. In order to allow of said plate being turned back the steadying pins 14 are removed. As shown more particularly in the detail drawings (Figs. 3, 4 and 5) the said guide member 3 may be and preferably is a thin lamina or plate designed and shaped to the said measurements and relations observed by Count Spee and Dr. Bonwill. It defines the relation of the teeth to the temporo-mandibular joint and expresses in the solid those relations which a dentist must maintain in the occluding, articulating or antagonizing of artificial teeth anatomically. It gives him a visual and ready test of accuracy, which means great simplification of work. The said guiding surface 3 may be made of any substance (as for instance metal or celluloid) sufficiently rigid to maintain its shape in use.

While a rough approximation may be made by a guide curved in one direction only like a portion of a cylinder, a satisfactory result can only be achieved in view of the anatomical conformations, relations and measurements above referred to, by a guide such as shown in Fig. 5 curved in every direction like the portion of a sphere.

To facilitate the arranging of artificial teeth in a parabolic curve known to dentists as the "dental arch" lines may be inscribed, or alternatively ridges may be fixed either to the convex or concave side of the guide. One line 13 is shown in Fig. 4.

While the method of attachment of my instrument to the articulator may be varied so long as the determinate relations arrived at on the basis of Spee's observations and Bonwill's observations are maintained, I illustrate by way of example in the accompanying drawings a very convenient attachment in practice. The arms 100 supporting the instrument are pivoted to the parts of the articulator which represent the condyles of the human jaw, whether they form a hinged joint of the articulator as shown in Fig. 2 or not. A convenient method of pivoting the instrument is illustrated by way of example and comprises the employment of pins passed through holes 1 formed in the arms 100 and corresponding holes 2 in the lower member of the articulator. A line between the pivots of the guide 3 thus forms the base of Bonwill's triangle as shown in Fig. 9, while a point determined by actual measurement and marked on the lamina, forms the apex of Bonwill's triangle (see the point 1, in Fig. 9). As the arms 10 of the guide 3 are attached to the arms 100 about the point 15 and are prevented when in use from pivoting about the said point by the steadying pins 14 said guide moves with the rest of the instrument on the same axis as the parts representing the condyles of the human jaw and so is variable with the articulator to special conditions present, as for instance, variations in the sizes of teeth and jaws in the individual subject.

The line A—B in Fig. 1 represents the occlusal plane, it is shown as a straight line, but in the human subject this plane is usually curved. The artificial teeth are fixed to the model (the lower teeth first by preference) in such a manner that while they conform to the general ideas on this subject the occlusal surfaces can be easily and quickly adjusted to this guiding surface 3. When the instrument is fixed to the articulator as shown in Fig. 1, the surface 3 (Fig. 2) assumes approximately the plane A—B of Fig. 1 and moves on the axis of the articulator. The lower teeth are fitted to the models in such a manner that their occlusal surfaces conform to the lower surface of the occlusal plane guide 3 and conform also to the curve 13 representing the dental arch. The instrument is then removed and the upper teeth are thereafter adjusted to the lower teeth or fixed in position. The process may, of course, be reversed and the upper teeth fitted to the upper model first by means of the occlusal plane guide 3 and the lower teeth thereafter adjusted to the upper teeth, but provision must be made in the occlusal plane guide to accommodate the overlapping of the upper teeth over the lower teeth by cutting out a section of the front of the occlusal plane guide.

It must be understood that although I show in Figs. 1 and 2 a combined instrument, I may use if desired each member of of the instrument independently of the other. In order to allow of this the arms 10 in Figs. 3 and 4 are shown of sufficient length to allow of the guide being pivoted directly to those parts of the articulator which represent the condyles of the human jaw.

What I claim is:

1. An articulator, comprising a base, a support or pivot on the base positioned to correspond with the articular surface of the temporo-mandibular joint in the human subject, and guiding means pivoted to said support in order to show when in position the complete occlusal plane of the normal human subject.

2. An articulator, comprising a base, a support or pivot on the base positioned to correspond with the articular surface of the temporo-mandibular joint in the human subject, and a spherically curved plate pivoted to said support in order to show when in position the complete occlusal plane of the normal human subject.

3. An articulator, comprising a base, a support or pivot on the base positioned to correspond with the articular surface of the temporo-mandibular joint in the human subject, and a frame pivotally connected to said support and extending in the occlusal plane and adapted to support the trial plates and models of the jaws in relation to the articulator corresponding to that between the rows of teeth and the temporo-mandibular joint in the normal human subject.

4. An articulator, comprising a base, a support or pivot on the base positioned to correspond with the articular surface of the temporo-mandibular joint in the human subject, a frame pivotally connected to said support and extending in the occlusal plane and adapted to support the trial plates and models of the jaws in relation to the articulator corresponding to that between the rows of teeth and the temporo-mandibular joint in the normal human subject, and guiding means pivotally connected to said support in order to show when in position the complete occlusal plane of the normal human subject.

In testimony whereof I have signed my name to this specification in the presence of two subscribing witnesses.

JOHN PRINGLE CRICHTON.

Witnesses:
ALLAN BAXTER,
JOHN M. MUNGO.